Jan. 13, 1931.  H. C. IVES ET AL  1,789,042
PIVOTAL MEANS FOR TOY CAR TRUCKS
Filed April 12, 1928

INVENTORS:
Harry C. Ives and
Hugh H. Newsom
BY
Chamberlain & Newman
ATTORNEYS

Patented Jan. 13, 1931

1,789,042

UNITED STATES PATENT OFFICE

HARRY C. IVES, OF BRIDGEPORT, CONNECTICUT, AND HUGH R. NEWSOM, OF NEW YORK, N. Y., ASSIGNORS, BY MESNE ASSIGNMENTS, TO THE IVES CORPORATION, OF BRIDGEPORT, CONNECTICUT, A CORPORATION OF CONNECTICUT

PIVOTAL MEANS FOR TOY CAR TRUCKS

Application filed April 12, 1928. Serial No. 269,336.

This invention relates to toy railway cars and resides more particularly in the construction of the car truck and means for attaching the same to the car body.

The invention has for its object to provide a simple form of construction whereby the trucks may readily be connected and disconnected from the car body by the operation of a single screw, and further to provide pivotal means, for the attachment of the trucks to the car bodies which will prevent the trucks from turning around on their pivots and consequently insure the retaining of the forward end portion of the trucks in a forward position.

Still another and important feature of the invention is to provide the pivotal connection of truck to body, forward of the center of the truck, and in a way to provide a longer coupler link and to connect the inner end thereof to the pivot so as to allow the link to swing upon a larger radius and especially to form the connection for coupler link to the pivotal connection of trucks, rather than to the forward end portion of the car, which is obviously objectionable since it causes friction of wheels with rails when the car is travelling over curved sections of track.

It will be further noted that by reason of the connection of the coupler link to the pivotal connection of truck and car and by the location of the said pivot forward of the center of the car the truck serves, as it should, to carry the car rather than the car carrying the truck.

Other features of the invention and novel combinations of parts in addition to the above will be hereinafter described in connection with the accompanying drawings which illustrate a preferred form of the invention.

Figure 1:
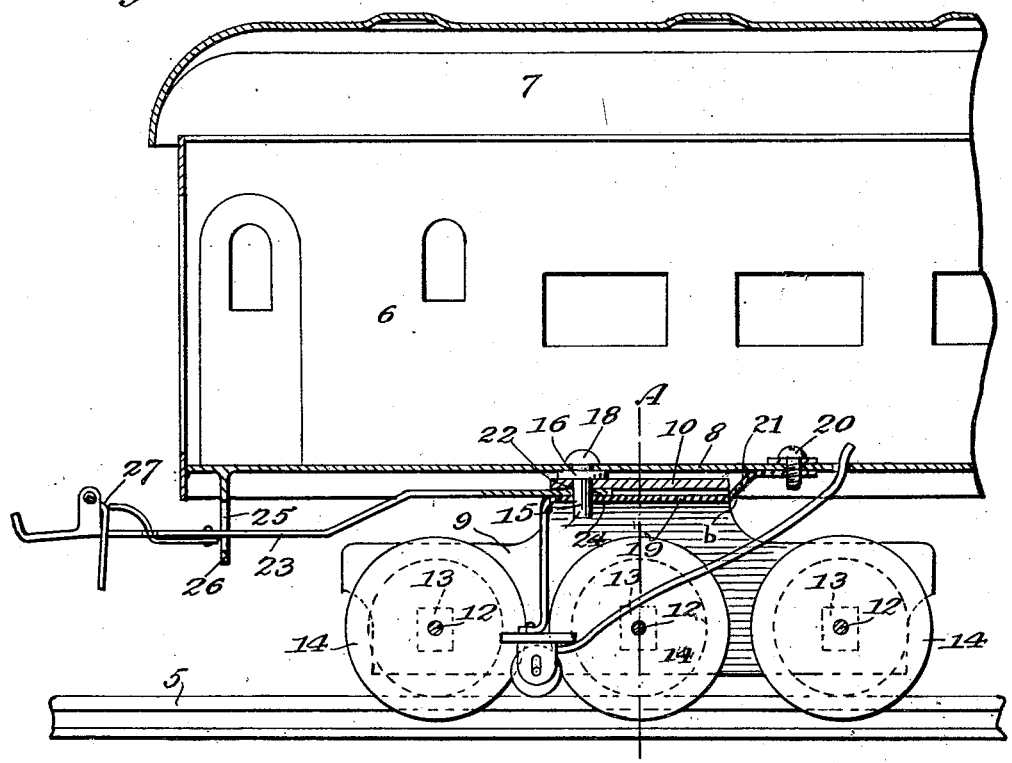
Figure 2:
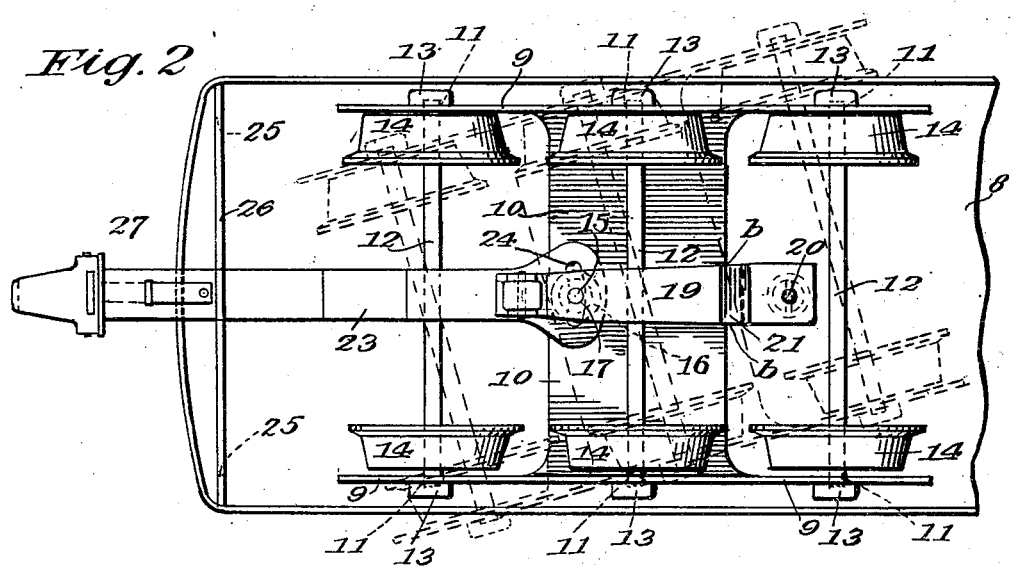

Similar characters of reference denote like or corresponding parts throughout the several figures of the accompanying drawings forming a part of this specification and upon which:

Fig. 1 shows a vertical, longitudinal sectional view of one end portion of a toy passenger car body and a six wheel truck pivotally connected thereto in accordance with our invention; and Fig. 2 shows an inverted bottom plan view of the truck, coupler and car body as shown in Fig. 1.

Referring in detail to the characters of reference marked upon the drawings, 5 represents a track rail, 6 a passenger car body and 7 a cover which in practice is made detachable to permit of the attachment and assemblage of the several parts of the car body. 8 represents a truck frame which is preferably made of one piece though includes opposite vertically disposed parallel side portions 9—9 and a top or horizontal platform member 10 that joins the two side portions together.

The sides are provided with aligned holes 11—11 in which the end portions of the axles 12 are journalled. Thin sheet metal brass boxes 13 are shown attached to the outer face of the side portions 9—9 to cover the ends of the axles and to dress up the side face of the truck in imitation of a full size commercial truck. Each of the axles 12 are provided with a flanged wheel 14 upon its outer end portions to engage and roll upon the track rail 5.

This truck frame as shown described with attached axles and wheels comprises a six wheeled truck as shown in the drawings but as will be obvious of course, so far as our invention is concerned, that the same would be equally applicable to a four wheel truck including a shorter frame and but two axles and four wheels.

For the attachment of the truck we provide a stud 15 having an integral collar 16 and a depending pin 17. This stud is seated in a hole in the floor of the car with its collar against the under side and is secured to the floor by having its upper end portion swedged down to form a rivet head 18 upon the inside of the car. The stud thus becomes a fixed pivotal member of the car, upon which the truck is pivotally connected. This pin extends down through a hole in the platform of the truck frame and similarly engages a bracket 19 attached to the underside of the car body by means of a screw 20 inserted from the inside. The bracket 19 may be formed of sheet metal and includes a bent shoulder portion 21 whereby the one end portion of the bracket is snugly seated against the underside of the car bottom and the other end portion disposed in spaced relation to the bottom, forming a space therebetween to accommodate the platform of the truck frame which is pivotally mounted therebetween and upon the stud 17 before mentioned.

The forward end of the bracket 19 may be extended and disposed downward as at 28 to insulatively carry a contact roll 29 for engagement with the third rail of the track. One end a wire 30 is connected to this roller and the other carried up through the bottom of the car for lighting or such other purposes as may be required.

Line A as shown in Fig. 1 indicates the center of the length of the car truck and substantially in line with the center axle of a six wheel truck or midway of the two axles of a four wheel truck. This center line as thus disclosed has so far as we are aware, heretofore been the point of pivotal connection of this type of truck to car bodies, and were thus free to turn entirely around, there being no front end as distinguished from the rear end. Where trucks are centrally pivotally connected and adapted to turn around on a pivot it is more difficult to place the cars on the track as the trucks will invariably swing to a crosswise position rather than to remain in alignment with the cars and track, and therefore require more time and patience in the placing of a train on a track of this kind.

We have therefore located our pivotal pin 17 in the floor of the car and nearer to the ends thereof and formed of the pivotal hole 22 in the truck frame forward of the center line A and the center axle, leaving the larger portion of the truck disposed toward the center of the car and the remaining smaller portion disposed toward the outer end of the car. The inner end of the coupler link 23 is provided with a slot 24 through which the pivotal pin 17 is positioned and whereby a hinged connection of coupler link with truck pivot is formed. This inner slotted end of coupler link is supported between the under side of the platform 8 of the truck frame and the top side of the bracket and by means of which latter it is held in its connected hinged pivotal relation. The forward end of the coupler link is supported in a relatively long slot 25 formed in a depending cross member 26 secured to the under side of the floor of the end portions of the car in a way to form ample room for the coupler link to swing backward and forward, as for instance when going around a curve.

27 represents the coupler mechanism carried on the outer end of the coupler link, the same being substantially like that disclosed in our former patent. In Fig. 2, we have also illustrated by dotted lines an angular position of the truck as assumed when swung upon its pivot 17 and which represents the extent to which this truck may turn upon its pivot with relation to the car body and wherein it is not permitted to turn clear around as is the case with most toy railway car trucks.

This particular stop means consists of the shouldered portion 21 of the bracket 19 which is secured to the underside of the central portion of the car and which for our purpose serves as a stop for the rear edge portions $b$ of the platform of the truck, see Fig. 2. From a careful study and comparison of this construction as shown in both Figs. 1 and 2, it will be seen that the truck frame is free to move to a limited extent, upon its pivot but that upon reaching the position illustrated by dotted lines in Fig. 2 the said edge portions $b$ of the truck platform will abut against the shoulder portions of the bracket and prevent the further turning of the truck, thus at all times retaining the greater portion of the truck disposed inward longitudinally of the car and toward the middle of the length of the car and the lesser portion of the truck outward toward the end.

We find in practice that a coupler link or draw bar connection as herein shown, directly to the pivotal connection of the truck with the car, and not with the forward end of the car, provides a more direct line of draft and reduces the amount of friction as between the truck wheels and track, thus lightening the load for the locomotive. This form of connection also produces a cheaper construction since in the assembling of the parts the truck and coupler link are connected by means of a single screw.

Having thus described our invention, what we claim and desire to secure by Letters Patent is:

1. The combination with a car body, of a truck pivotally connected thereto, and a coupler link loosely connected to said pivotal connection to move laterally independent thereof.

2. The combination with a car body, of a truck pivotally connected thereto, said pivotal connection being forward of a center line drawn crosswise through the truck, and a coupler link connected to said pivotal connection of car and truck.

3. The combination with a car body, of a truck including a truck frame and wheels, a pivotal stud secured to the car body and engaging with the truck frame forward of a cross line drawn through the center of the truck, a bracket attached to the car body and engaging the stud in spaced relation to the floor of the car body to support the truck and limit the movement of the truck frame on the stud.

4. The combination with a car body, of a truck including a truck frame and wheels, a pivotal stud secured to the car body and engaging with the truck frame forward of a cross line drawn through the center of the truck, a bracket attached to the car body and engaging the stud in spaced relation to the floor of the car body and beneath the platform of the truck, a coupler link the inner end of which is hingedly connected to said stud.

5. The combination with a car body, of a truck frame, a pivotal stud secured to the car body and extended down through the truck frame and a bracket secured to the under side of the car and including an arm that projects across the under side of the truck frame and engages the stud in a manner to support the truck.

6. The combination with a car body, of a truck, a pin for pivotally connecting the truck to the car body, a bracket secured to the car and extended below the truck frame and engaging the pin, and an electric contact roller insulatively carried by the bracket for engagement with a live rail.

Signed at Bridgeport, in the county of Fairfield and State of Connecticut, this 27th day of March, A. D. 1928.

HARRY C. IVES.
HUGH R. NEWSOM.